US012649382B2

(12) United States Patent
Singh et al.

(10) Patent No.: US 12,649,382 B2
(45) Date of Patent: Jun. 9, 2026

(54) COMPUTER IMPLEMENTED METHOD FOR CONTROLLING ENERGY STORAGE OF A BATTERY PACK

(71) Applicant: VOLVO TRUCK CORPORATION, Gothenburg (SE)

(72) Inventors: Gurpreet Singh, Västra Frölunda (SE); Linus Hallberg, Säve (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 244 days.

(21) Appl. No.: 18/524,787

(22) Filed: Nov. 30, 2023

(65) Prior Publication Data

US 2024/0190290 A1 Jun. 13, 2024

(30) Foreign Application Priority Data

Dec. 7, 2022 (EP) ..................................... 22211945

(51) Int. Cl.
| | |
|---|---|
| *B60L 58/12* | (2019.01) |
| *B60L 7/10* | (2006.01) |
| *B60T 17/22* | (2006.01) |

(52) U.S. Cl.
CPC ................. *B60L 58/12* (2019.02); *B60L 7/10* (2013.01); *B60T 17/22* (2013.01); *B60L 2240/547* (2013.01)

(58) Field of Classification Search
None
See application file for complete search history.

(56) References Cited

U.S. PATENT DOCUMENTS

| | | | | |
|---|---|---|---|---|
| 12,330,533 B2* | 6/2025 | Hoshi | ....................... | B60L 7/26 |
| 2009/0266631 A1 | 10/2009 | Kikuchi | | |
| 2011/0148363 A1* | 6/2011 | Frisch | ................... | H01M 10/44 |
| | | | | 324/426 |
| 2015/0094926 A1 | 4/2015 | O'Meachair | | |

(Continued)

FOREIGN PATENT DOCUMENTS

| | | | |
|---|---|---|---|
| DE | 102019207158 A1 | 11/2020 | |
| EP | 2789516 A1 | 10/2014 | |

(Continued)

OTHER PUBLICATIONS

Extended European Search Report in corresponding European Application No. 22211945.5 dated Jun. 1, 2023 (11 pages).

*Primary Examiner* — Justin S Lee
(74) *Attorney, Agent, or Firm* — Jeffri A. Kaminski; Venable LLP

(57) ABSTRACT
A computer system includes a processor device configured to determine the temperature of the service brakes of an electric vehicle, determine operating windows of a battery pack of the electric vehicle defined by its operating voltage according to default predetermined voltage limits, and according to extended predetermined voltage limits in which the upper limit exceeds the corresponding upper limit of the default predetermined voltage limits; compare the determined temperature of the service brakes with a predetermined temperature threshold, and in response of the determined temperature of the service brakes being above the predetermined temperature threshold, operate the battery pack of the electric vehicle within the operating window defined by extended predetermined voltage limits.

20 Claims, 4 Drawing Sheets

(56)              References Cited

U.S. PATENT DOCUMENTS

2015/0105948  A1      4/2015   Chang et al.
2020/0122728  A1*    4/2020   Murase ..................... B60L 7/18

FOREIGN PATENT DOCUMENTS

JP            2018083573  A   *   5/2018
JP              6984290  B2  *  12/2021
KR          20180007122  A   *   1/2018   .......... B60L 15/2009

* cited by examiner

COMPUTER IMPLEMENTED METHOD FOR CONTROLLING ENERGY STORAGE OF A BATTERY PACK

TECHNICAL FIELD

The disclosure relates generally to controlling energy storage of a battery pack in a rechargeable energy storage system, RESS, of a vehicle. In particular aspects, the disclosure relates to a computer implemented method for controlling energy storage of a battery pack. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine. In either way, energy storage devices are used to store the energy needed in order to operate the engine for propelling the vehicle. For an electric machine, the energy storage devices may be battery packs or supercapacitors, comprised in a rechargeable energy storage system, RESS. Both fully electrically operated vehicles and hybrid vehicles may be referred to as electric vehicles.

In an electric vehicle, the electric machine is part of a powertrain which transform energy from the energy storage system to the propelling means, typically the wheels of the vehicle. For this purpose, the powertrain further comprises transmission and drive shafts. In order to control the operation of the engine, and any related actions such as e.g. power or energy to be drawn from the RESS, the vehicle comprises a control unit or a control system comprising at least one control unit. For example, in a vehicle comprising an electric machine, the control unit may be configured to control the energy and power drawn from the battery pack to the electric machine by an electric machine driver which is configured to control the operation of the electric machine.

For RESS comprising a battery pack, the battery pack is normally restricted to be operated within certain operating windows of the state-of-charge, SOC, the operating voltage and the operating current. Therefore, not all energy of the battery pack is made available for usage. Moreover, under certain circumstances, it would be desired to store more energy of the battery pack than what is allowed according to the operating windows. Thus, there is a need in the industry for an improved control of the powertrain, in particular for controlling energy or power utilization of the battery pack.

SUMMARY

According to a first aspect of the disclosure, computer system comprising a processor device is provided. The processor device is configured to:

determine the temperature of the service brakes of an electric vehicle, determine operating windows of a battery pack of the electric vehicle defined by its operating voltage according to default predetermined voltage limits, and according to extended predetermined voltage limits in which the upper limit exceeds the corresponding upper limit of the default predetermined voltage limits;

compare the determined temperature of the service brakes with a predetermined temperature threshold, in response of the determined temperature of the service brakes being above the predetermined temperature threshold, operate the battery pack of the electric vehicle within the operating window defined by extended predetermined voltage limits.

The first aspect of the disclosure may seek to overcome problems relating to overheated service brakes. A technical benefit may include improved control of storing energy in the battery pack of the electric vehicle in response to that the temperature of the service brakes is becoming hotter, or becoming overheated, by being above the predetermined temperature threshold. In other words, utilization of the extended predetermined voltage limits of the battery pack results in that more energy can be stored in the battery pack and a relief of the service brakes. Thus, the temperature, or at least the temperature increase, of the service brakes may be reduced. It should be understood that the electric vehicle comprises a regenerative braking system configured to charge the battery pack during braking of the electric vehicle. Thus, the braking of the electric vehicle can be achieved by the service brakes and/or the regenerative braking system. However, the braking capacity of the regenerative braking system is limited by the amount of energy which can be stored in the battery pack, and the braking capacity of the service brakes is correlated to the temperature of the service brakes. If the temperature of the service brakes becomes too high (i.e. critically high) the function of the service brakes may be impaired, or even lost. Stated differently, in response of that the determined temperature of the service brakes is above the predetermined temperature threshold, the processor device causes, or instructs, the battery pack to operate within the operating window defined by extended predetermined voltage limits. The first aspect of the disclosure may provide an energy management of the battery pack that utilizes the temperature of the service brakes for determining and providing improved regenerative charging within an available voltage range of the battery pack.

A technical benefit of the first aspect of the disclosure, may include that the extended predetermined voltage limits can be utilized in an advantageous manner. That is, as the temperature of the service brakes is used as input to determine the operating voltage window of the battery pack, the adapted energy availability by the extended predetermined voltage limits of the battery pack can allow for a better usage of the regenerative braking. Thus, the battery pack may be operated within the operating window defined by the extended predetermined voltage limits in order to improve utilization of the regenerative braking system.

By the first aspect of the disclosure, the operation of the battery pack by the extended predetermined voltage limits may be utilized in an efficient manner. Typically, operating the battery pack by the extended predetermined voltage limits implies an increased aging and decreased State-of-Health, SOH, of the battery pack as compared to operating the battery pack by the default predetermined voltage limits. On the other hand, operating the battery pack by the extended predetermined voltage limits implies an increased battery pack utilization (e.g. increased battery pack capacity of storing energy) as compared to operating the battery pack by the default predetermined voltage limits. Therefore, operating the battery pack by the extended predetermined voltage limits in response of that the temperature of the service brakes is above the predetermined temperature threshold may provide for that the increased battery pack utilization is used in an efficient way.

According to a second aspect of the disclosure, a computer-implemented method is provided. The method comprises:

determining, by a processor device of a computer system, the temperature of the service brakes of an electric vehicle, determining, by the processor device, operating windows of a battery pack of the electric vehicle defined by its operating voltage according to default predetermined voltage limits, and according to extended predetermined voltage limits in which the upper limit exceeds the corresponding upper limit of the default predetermined voltage limits;

comparing, by the processor device, the determined temperature of the service brakes with a predetermined temperature threshold, in response of the determined temperature of the service brakes being above the predetermined temperature threshold, operating, by the processor device, the battery pack of the electric vehicle within the operating window defined by extended predetermined voltage limits.

The second aspect of the disclosure may seek to solve the same problem as described for the first aspect of the disclosure. Thus, effects and features of the second aspect of the disclosure are largely analogous to those described above in connection with the first aspect of the disclosure. Examples and embodiments mentioned in relation to the first aspect of the disclosure are largely compatible with the second aspect of the disclosure, and vice versa.

In some examples, the method further comprises receiving, by the processor device, data of predefined operating voltage windows corresponding to the default predetermined voltage limits and to the extended predetermined voltage limits from stored data comprised in a memory, e.g. a memory of the electric vehicle, or a memory of an external server database. A technical benefit may include usage of reliable data and efficient handling and communication of data.

In some examples, the battery pack is comprised in a rechargeable energy storage system, RESS, of the electric vehicle. The battery pack is configured to be operated within at least a first predefined operating window defined by the default predetermined voltage limits, and by at least a second predefined operating window defined by the extended predetermined voltage limits. The RESS may comprise one or several battery packs connected in parallel, and each battery pack typically comprises a plurality of series-connected battery cells. The battery cells may be clustered into battery modules, wherein each battery pack comprises a plurality of series-connected battery modules.

In some examples, the method comprises operating, by the processor device, each of the battery cell in the battery pack within an operating window defined by extended predetermined voltage cell-limits. Thus, each battery cell in the battery pack may be configured to be operated by operating windows defined by its operating voltage according to default predetermined voltage cell-limits, and according to extended predetermined voltage cell-limits in which the upper limit exceeds the corresponding upper limit of the default predetermined voltage cell-limits. For the operating window within the default predetermined voltage limits of the battery pack, all of the battery cells in that battery pack are operated by default predetermined voltage cell-limits, and for the operating window within the extended predetermined voltage limits of the battery pack, all of the battery cells in that battery pack are operated by extended predetermined voltage cell-limits.

In some examples, the method comprises identifying, by the processor device, a vehicle driving condition as belonging to a group of predefined vehicle driving conditions defined as regenerative limiting, wherein comparing the determined temperature of the service brakes with a predetermined temperature threshold is performed in response to identifying such regenerative limiting vehicle condition. A technical benefit may include efficient determination of the temperature of the service brakes, and/or efficient operation of the battery pack within the extended predetermined voltage limits. That is, the comparison between the determined temperature of the service brakes with the predetermined temperature threshold, and the correlated operation of the battery pack of the electric vehicle within the operating window defined by extended predetermined voltage limits in response of the determined temperature of the service brakes being above the predetermined temperature threshold, are performed in response to identification of a regenerative limiting vehicle condition. Thus, when the regenerative braking system of the vehicle is no longer available, or corresponds to a low braking capacity, as the vehicle condition is identified as regenerative limiting, the temperature of the service brakes is compared to the predetermined temperature threshold, and if being above the predetermined temperature threshold, the energy storing capacity of the battery pack is increased by being operated within the extended predetermined voltage limits.

In some examples, the method comprises identifying, by the processor device, a vehicle driving condition as belonging to a group of predefined vehicle driving conditions defined as non-regenerative limiting, and in response of identifying a non-regenerative vehicle condition, operating, by the processor device, the battery pack of the electric vehicle within the operating window defined by default predetermined voltage limits.

In other words, and in some examples, the method comprises, in response of the determined temperature of the service brakes being below the predetermined temperature threshold, operating, by the processor device, the battery pack of the electric vehicle within the operating window defined by default predetermined voltage limits. Thus, according to such examples, the battery pack is operated by extended predetermined voltage limits in response to the temperature of the brakes being above the predetermined temperature threshold, otherwise, the battery pack is operated by the default predetermined voltage limits. In other words, the processor device causes the battery pack to be operated within the operating window defined by the default or extended predetermined voltage limits.

In some examples, the battery pack is configured to be operated according to predefined operating windows with regards to the state-of-charge, SOC, according to default predetermined SOC limits, and possibly, extended predetermined SOC limits (the extended predetermined SOC limits having at least one of the upper limit and lower limit exceeding the corresponding limit of the default predetermined SOC limits). In some examples, the method comprises, in response of the determined temperature of the service brakes being above the predetermined temperature threshold, operating, by the processor device, the battery pack of the electric vehicle within the operating window defined by extended predetermined voltage limits and within the operating window defined by default predetermined SOC limits. A technical benefit may include non-violation of the default predetermined SOC limits while still allowing for more energy to be stored in the battery pack owing to the operation of the battery pack by the extended predetermined voltage limits.

In some examples, operating, by the processor device, the battery pack by default predetermined voltage limits includes prohibiting concurrent operation of the battery pack by extended predetermined voltage limits. In other words, when prevailing conditions and/or criteria are controlling the operation of the battery pack within the operating window defined by default predetermined voltage limits, operation of the battery pack within the operating window defined by extended predetermined voltage limits is prohibited (obviously only until prevailing conditions and/or criteria for operating the battery pack by extended predetermined voltage limits are fulfilled). Thus, in response of the determined temperature of the service brakes being above the predetermined temperature threshold, the method may comprise changing the operating window, by the processor device, of the battery pack of the electric vehicle from the operating window defined by default predetermined voltage limits to the operating window defined by extended predetermined voltage limits.

In some examples, the method further comprises comparing, by the processor device, the state-of-charge, SOC, of the battery pack with a preset SOC threshold, wherein a regenerative limiting vehicle driving condition is defined as a vehicle driving condition in which the SOC of the battery pack is equal to, or above, the preset SOC threshold. A technical benefit may include efficient distinguishing between vehicle conditions being regenerative limiting and non-regenerative limiting.

In some examples, the preset SOC threshold is the upper limit of a predefined operating window of the battery pack defined by the default predetermined SOC limits. A technical benefit may include efficient distinguishing between vehicle conditions being regenerative limiting and non-regenerative limiting. The default predetermined SOC limits may e.g. extend from a lower default SOC limit having a SOC-value between 15% and 30%, to an upper default SOC limit having a SOC-value between 65% and 85%. It should be understood that the SOC of the battery pack is defined to extend from 0% to 100%, in which 0% defines an empty battery pack and 100% defines a fully charged battery pack. Thus, SOC defines the level of charge of the battery pack relative to its capacity. Thus, the lower limit of 0% and the upper limit of 100% may be defined as the absolute SOC limits of the battery pack.

In some examples, identifying a vehicle condition as regenerative limiting means that charging of the battery pack by the regenerative braking system to its nominally fully charged level has occurred, the nominally fully charged level typically being set by the upper limit of the predefined operating window defined by default predetermined SOC limits. Correspondingly, and for example, identifying a vehicle condition as non-regenerative limiting means that charging of the battery pack by the regenerative braking system to its nominally fully charged level has not occurred, and that the service brakes need not to be used, or at least not be used to a significant amount (which causes the temperature of the service brakes to reach and exceed the predetermined temperature threshold). The group of predefined vehicle conditions defined as regenerative limiting and non-regenerative limiting may e.g. be stored in the previously mentioned memory, e.g. in the form of a look-up table, and may be received by the processor device.

In some examples, the method comprises determining, by the processor device, predefined operating windows of the battery pack of the electric vehicle defined by its operating current according to default predetermined current limits, and according to extended predetermined current limits in which at least one of the upper limit and lower limit exceeds the corresponding limit of the default predetermined current limits. A technical benefit may include improved control of the battery pack with regards to the operating current. In some examples, operating, by the processor device, the battery pack by default predetermined current limits includes prohibiting concurrent operation of the battery pack by extended predetermined current limits.

In some examples, the method comprises in response of the determined temperature of the service brakes being above the predetermined temperature threshold, operating, by the processor device, the battery pack of the electric vehicle within the operating window defined by the default predetermined current limits. A technical benefit may include utilization of the extended predetermined voltage limits to store more energy in the battery pack as previously described, while the respecting the default predetermined current limits.

In some examples, the method comprises in response of the determined temperature of the service brakes being above the predetermined temperature threshold, operating, by the processor device, the battery pack of the electric vehicle within the operating window defined by the extended predetermined current limits. A technical benefit may include utilization of the extended predetermined current limits to store more energy in the battery pack.

In some examples, the extended predetermined current limits are stricter than predetermined safety critical current limits of the battery pack. A technical benefit may include safe operation of the battery pack during operation of the battery pack within the operating window defined by the extended predetermined current limits. Thus, the battery pack may be configured to be operated according to at least three different predefined operating windows with regards to the operating current: within the default predetermined current limits; within the extended predetermined current limits in which at least one of the upper limit and lower limit exceeds the corresponding limit of the default predetermined current limits; and within the safety critical current limits in which the upper limit and lower limit exceeds the corresponding limits of the extended predetermined current limits.

In some examples, the method further comprises receiving, by the processor device, measurement temperature data from a temperature sensor of the service brakes, and using the received measurement temperature data as the determined temperature of the service brakes. A technical benefit may include usage of reliable temperature data and efficient handling and communication of data. It should be noted that the vehicle may comprise a plurality of temperature sensors, one for each of the service brakes, and that the measured temperature data corresponds to the mean value of the temperature sensors, or of the highest value of the temperature sensors.

In some examples, the default predetermined voltage limits extend up to a higher default voltage limit having a voltage-value between 100% and 105% of the nominal operating voltage of the battery pack. A technical benefit may include well defined and delimiting default predetermined voltage limits.

In some examples, the extended predetermined voltage limits extend up to a higher extended voltage limit having a voltage-value between 105% and 115% of the nominal operating voltage of the battery pack. A technical benefit may include well defined and delimiting extended predetermined voltage limits.

In some examples, the default predetermined voltage limits extend from a lower default voltage limit having a voltage-value between 75% and 85% of the nominal operating voltage of the battery pack. In some examples, the extended predetermined voltage limits extend from a lower extended voltage limit having a voltage-value between 75% and 85% of the nominal operating voltage of the battery pack (i.e. the same as for the lower default voltage limit).

In some examples, in which the processor device controls the voltage limits of the battery pack by controlling the voltage limit of each batter cell in the battery pack, the higher default voltage cell-limit has a voltage-value between 100% and 105% of the nominal operating voltage of the battery cell. The lower default voltage cell-limit may e.g. have a voltage-value between 75% and 85% of the nominal operating voltage of the battery cell. Correspondingly, the higher extended voltage cell-limit has a voltage-value between 105% and 115% of the nominal operating voltage of the battery cell. The lower extended voltage cell-limit may have a voltage-value between 75% and 85% of the nominal operating voltage of the battery cell. The nominal operating voltage of the battery cell may e.g. be 4 V.

In some examples, the extended predetermined voltage limits are stricter than predetermined safety critical voltage limits of the battery pack. A technical benefit may include safe operation of the battery pack during operation of the battery pack within the operating window defined by the extended predetermined voltage limits. Thus, the battery pack may be configured to be operated according to at least three different predefined operating windows with regards to the operating voltage: within the default predetermined voltage limits; within the extended predetermined voltage limits in which the upper limit exceeds the corresponding upper limit of the default predetermined voltage limits; and within the safety critical voltage limits in which the upper limit and lower limit exceeds the corresponding limits of the extended predetermined voltage limits.

By providing a battery pack which is configured to be operated within predefined operating windows defined by its voltage and current according to corresponding default (or normal) predetermined voltage and current limits (the default predetermined voltage and current limits being set stricter than the corresponding safety critical limits) the battery pack is protected from unnecessary wear and other related problems. Moreover, by providing a battery pack which is also configured to be operated within predefined operating windows defined by its voltage and current according to corresponding extended predetermined voltage and current limits (the extended predetermined voltage and current limits being set stricter than the corresponding safety critical voltage and current limits) the battery pack may be better utilized compared to when being operated according to the default predetermined voltage and current limits, while still being protected from safety critical issues. During normal driving of the electric vehicle, e.g. when the temperature of the service brakes is below the predetermined temperature threshold, the battery pack is typically not allowed to violate the corresponding default predetermined voltage and current limits. During driving of the electric vehicle such that the temperature of the service brakes is above the predetermined temperature threshold, the battery pack is typically not allowed to violate the safety critical voltage and current limits, but is allowed to be operated within the extended predetermined voltage limits (and possibly even within the extended predetermined current limits).

In some examples, the method comprises comparing, by the processor device, the determined temperature of the service brakes with a predetermined safety critical temperature threshold, and in response of the determined temperature of the service brakes being above the predetermined safety critical temperature threshold, operating, by the processor device, the battery pack of the electric vehicle with no restrictions to the safety critical current limits and/or with no restrictions to the safety critical voltage limits. A technical benefit may include protection of the service brakes at the expense of the battery pack. Thus, in the extreme event in which the temperature of the service brakes exceeds the safety critical temperature threshold, the battery pack may be sacrificed in an attempt to reduce, or at least mitigate, the temperature of the service brakes.

In some examples, the method comprises, in response of the determined temperature of the service brakes being above the predetermined temperature threshold, and below the safety critical temperature threshold, operating, by the processor device, the battery pack of the electric vehicle within the operating window defined by extended predetermined voltage limits.

In some examples, the predetermined temperature threshold is chosen as a value of between 300° C. and 600° C. A technical benefit may include protection of the service brakes from becoming too hot, or become overheated.

In some examples, the safety critical temperature threshold is above 600° C., e.g. 610° C.

According to a third aspect of the disclosure, an energy storage system of a vehicle is provided. The energy storage system comprises a battery pack connectable to regenerative braking system configured to charge the battery pack by regenerative braking of the vehicle, and a control unit connectable to service brakes of the vehicle, the control unit being configured to:

determine the temperature of the service brakes of an electric vehicle, determine operating windows of the battery pack defined by its operating voltage according to default predetermined voltage limits, and according to extended predetermined voltage limits in which the upper limit exceeds the corresponding upper limit of the default voltage predetermined limits;

compare the determined temperature of the service brakes with a predetermined temperature threshold, in response of the determined temperature of the service brakes being above the predetermined temperature threshold, operate the battery pack of the electric vehicle within the predefined operating window defined by extended predetermined voltage limits.

The third aspect of the disclosure may seek to solve the same problem as described for the first and second aspects of the disclosure. Thus, effects and features of the third aspect of the disclosure are largely analogous to those described above in connection with the first and second aspects of the disclosure. Examples and embodiments mentioned in relation to the first and second aspects of the disclosure are largely compatible with the third aspect of the disclosure, and vice versa.

In some example, the energy storage system comprises a temperature sensor configured to provide measurement temperature of the service brakes, wherein the control unit is configured to use the received measurement temperature data as the determined temperature of the service brakes. A technical benefit may include usage of reliable temperature data and efficient handling and communication of data.

According to a fourth aspect of the disclosure, a vehicle comprising the processor to perform the method of the second aspect of the disclosure, or comprising the energy storage system of the third aspect of the disclosure, is provided. The processor may e.g. be that of the first aspect of the disclosure.

According to a fifth aspect of the disclosure, a computer program product comprising program code for performing, when executed by the processor device, the method of the second aspect of the disclosure is provided.

According to a sixth aspect of the disclosure, a control system comprising one or more control units configured to perform the method of the second aspect of the disclosure is provided.

According to a seventh aspect of the disclosure, a non-transitory computer-readable storage medium comprising instructions, which when executed by the processor device, cause the processor device to perform the method of the second aspect of the disclosure is provided.

The fourth to seventh aspects of the disclosure may seek to solve the same problem as described for the first to third aspects of the disclosure. Thus, effects and features of the fourth to seventh aspects of the disclosure are largely analogous to those described above in connection with the first to third aspects of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure. The object of the present inventive concept is to solve the problem relating to hot, or overheated, service brakes, and to provide an improved control of storing energy in the battery pack in response to that the temperature of the service brakes is becoming hotter, or becoming overheated, by being above a predetermined temperature threshold. The inventive concept solves the problem by, inter alia, in response of that the determined temperature of the service brakes is above the predetermined temperature threshold, operate the battery pack of the electric vehicle within an operating window defined by extended predetermined voltage limits, in which the upper limit exceeds the corresponding upper limit of default predetermined voltage limits.

Figure 1:
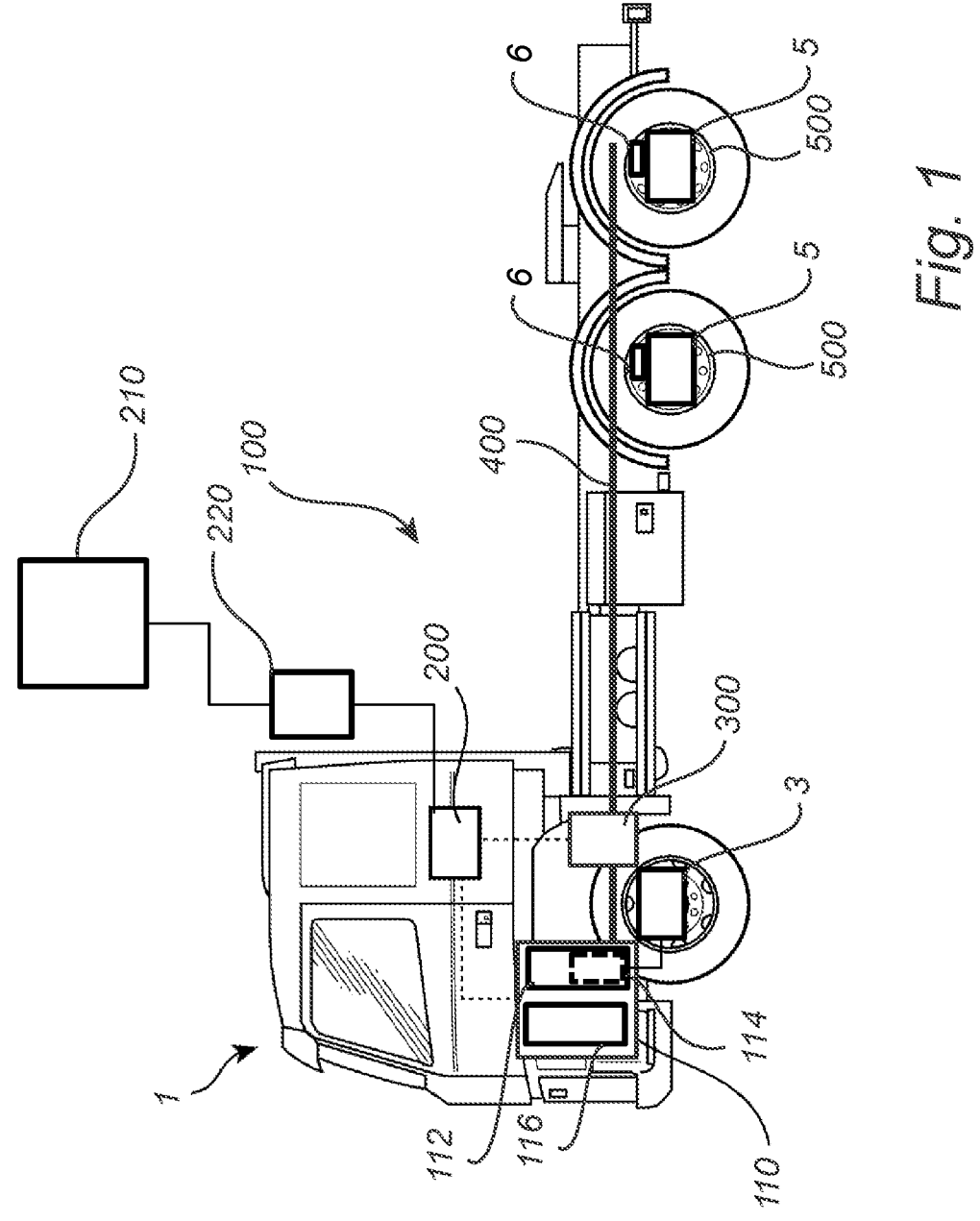
FIG. 1 is an exemplary, partly schematic, side view of an electric vehicle comprising a powertrain with a battery pack in a rechargeable energy storage system, RESS, and a control unit according to one example.

FIG. 1 shows an exemplary heavy duty truck 1. The truck 1 is an electric vehicle, such as a full electric vehicle or a hybrid, comprising a powertrain 100 having an electric driveline 110 comprising a rechargeable energy storage system, RESS, 112 including at least one battery pack 114, and a at least one electric machine 116 powered by the battery pack 114. As seen in FIG. 1, the powertrain 100 may further comprise a transmission 300 comprising at least a gearbox, and drive shafts 400 configured to transfer motion to the drive wheels 500.

The truck 1 typically comprises a regenerative braking system 3 of a known type. The regenerative braking system generally comprises a kinetic energy recovery system configured to transfer kinetic energy of an object in motion, i.e. the truck 1, into stored energy, i.e. charging of the battery pack 114, to slow the truck 1 down. For example, the regenerative braking system comprises an electric generator, which preferably is the same component as the previously mentioned electric machine. Thus, the energy produced when slowing the truck 1 down, typically by braking, is stored chemically in the battery pack (i.e. regenerative charging of the battery pack 114, or simply battery regeneration). The battery regeneration of the regenerative braking system is typically associated with a regeneration efficiency, i.e. how efficient the energy produced when slowing the truck 1 down is stored in the battery pack 114.

The truck 1 comprises service brakes 5 of a known type, here embodied as brakes on the wheels 5 of the two rear axles. The service brakes 5 forms a separate braking arrangement to the regenerative braking system 3. Thus, the braking of the truck 1 can be achieved by the service brakes 5 and/or the regenerative braking system 3. The braking capacity of the regenerative braking system 3 is at least limited by the amount of energy which can be stored in the battery pack 114, and the braking capacity of the service brakes 5 is correlated to the temperature of the service brakes 5. If the temperature of the service brakes 5 becomes overheated, or too high (e.g. critically high) the function of the service brakes 5 may be impaired, or even lost. In order to determine the temperature of the service brakes 5, the truck 1 comprises at least one temperature sensor 6 for determining the temperature of the service brakes 5. In the example of FIG. 1, the truck comprises a separate temperature sensor 6 for each of the service brakes 5.

The battery pack 114 is configured to be operated within predefined operating windows defined by its operating voltage, according to default predetermined voltage limits, and according to extended predetermined voltage limits in which the upper limit exceeds the corresponding upper limit of the default predetermined voltage limits.

Moreover, the battery pack 114 may be configured to be operated within predefined operating windows defined by its operating current according to default predetermined current limits, and according to extended predetermined current limits in which at least one of the upper limit and lower limit exceeds the corresponding limit of the default predetermined current limits.

Moreover, the battery pack 114 may be configured to be operated within predefined operating windows defined by its state-of-charge, SOC, according to default predetermined SOC limits, and possibly, extended predetermined SOC limits (the extended predetermined SOC limits having at least one of the upper limit and lower limit exceeding the corresponding limit of the default predetermined SOC limits).

The truck 1 further comprises control unit 200 configured to communicate with the RESS 112 and the batter pack 114. For example, the control unit 200 is configured to set the predefined operation windows of the battery pack 114 according to e.g. default predetermined voltage limits or extended predetermined voltage limits, i.e. to operate the battery pack 114 according to default predetermined voltage limits or extended predetermined voltage limits. The control unit 200 is configured to communicate with a memory 210, e.g. a memory of the truck 1, or a memory of an external server database, and receive data 220 from the memory 210. The memory 210 may form part of the control unit 200, or control system thereof.

Figure 2:
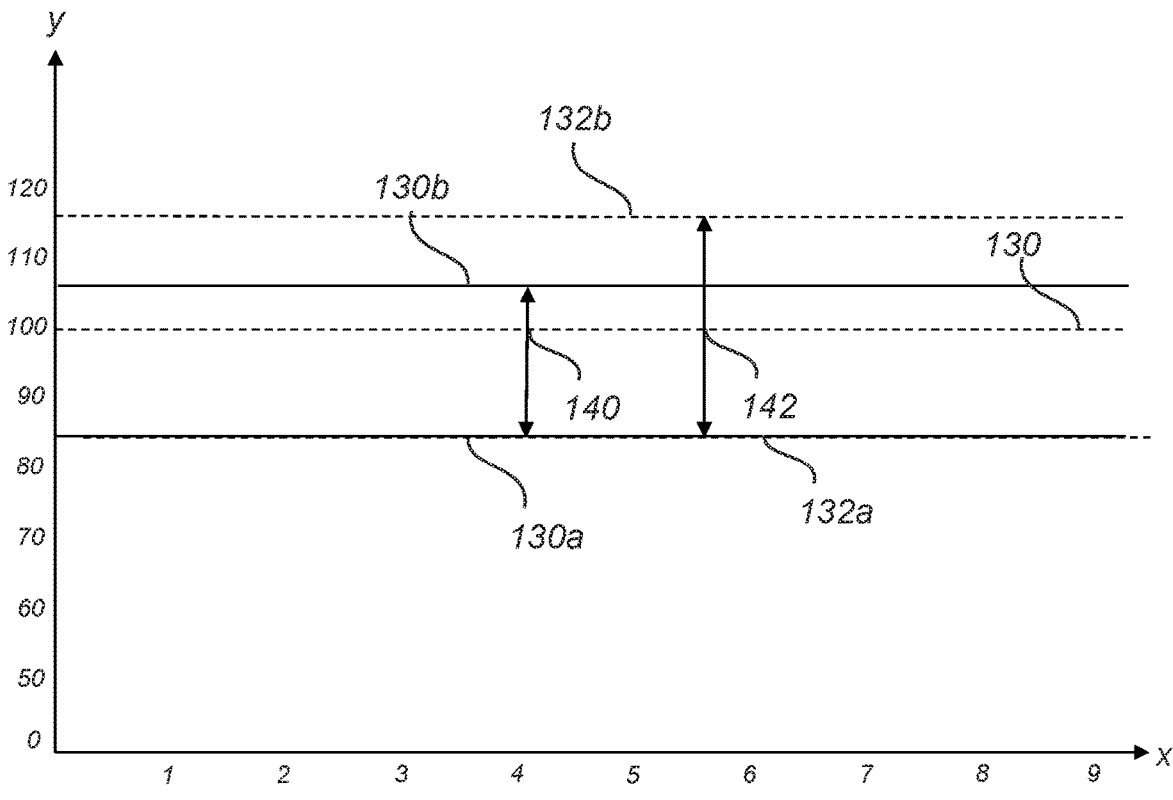
FIG. 2 is a graph showing normal and extended predetermined voltage limits of a battery pack according to one example.

In the graph of FIG. 2, the y-axis represents the operating voltage of the battery pack defined by the nominal operating voltage 130 of 100%, and the x-axis represents time (in units of e.g. minutes). Moreover, in the graph of FIG. 2, default predetermined voltage limits 130*a*, 130*b* are defined to extend from a lower default voltage limit 130*a* having an operating voltage-value of 85%, to an upper default voltage limit 130*b* having an operating voltage-value of 105%. The operating window 140 of the battery pack in accordance with the default predetermined voltage limits 130*a*, 130*b* is symbolized by a first double ended arrow 140. Thus, the battery pack is configured to be operated within the predefined operating window 140 according to the default predetermined voltage limits 130*a*, 130*b*.

In the graph of FIG. 2, extended predetermined voltage limits 132*a*, 132*b* are defined to extend from a lower extended voltage limit 132*a* having an operating voltage-value of 85%, to an upper extended voltage limit 132*b* having an operating voltage-value of 115%. The operating window 142 of the battery pack in accordance with the extended predetermined voltage limits 132*a*, 132*b* is symbolized by a second double ended arrow 142. Thus, the battery pack is configured to be operated within the predefined operating window 142 according to the extended predetermined voltage limits 132*a*, 132*b*. It should be noted that in the graph of FIG. 2, the upper default voltage limit 130*b* is set stricter than the corresponding upper extended voltage limits 132*b* (i.e. the upper default voltage limit 130*b* is less high than the upper extended voltage limit 132*b*). For simplicity, the operating voltage-values of the default predetermined voltage limits 130*a*, 130*b* and the extended predetermined voltage limits 132*a*, 132*b* are straight lines in FIG. 2, and are thus shown to be constant over the given time period (but they may alternatively vary over the given time period).

Figure 3:
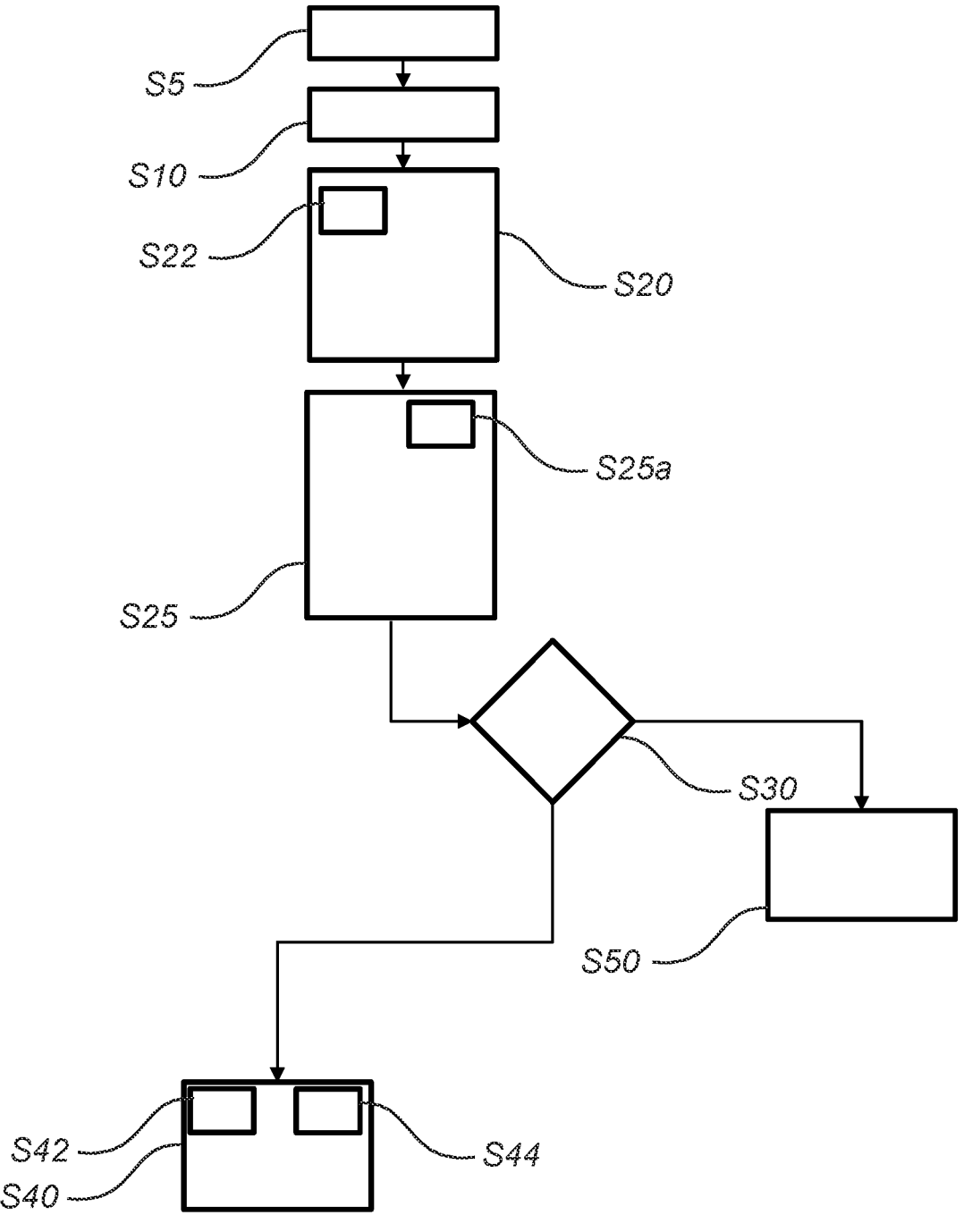
FIG. 3 is a flowchart illustrating the steps of a method according to one example.

FIG. 3 is a flow chart of a computer implemented method for controlling energy storage of a battery pack in a rechargeable energy storage system, RESS, of a vehicle, such as battery pack 114 of RESS 112 of truck 1 in FIG. 1, according to one example. The energy storage of the battery pack is controlled by at least setting the operating window defined by its operating voltage.

In a step S10, e.g. being a first step S10, the temperature of the service brakes of an electric vehicle is determined by a processor device of a computer system. For example, and with reference to FIG. 1, the processor device may be comprised in the control unit 200 of the truck 1, and the temperature of the service brakes 5 may be determined by the temperature sensors 6.

In a step S20, e.g. being a second step S20, operating windows of a battery pack of the electric vehicle defined by its operating voltage according to default predetermined voltage limits, and according to extended predetermined voltage limits in which the upper limit exceeds the corresponding upper limit of the default predetermined voltage limits are determined by the processor device. For example, and with reference to FIG. 1, the processor device may determine the operating windows by receiving instructions, or data 200, of the same from the memory 210. In some examples, the default predetermined voltage limits extend from a lower default voltage limit having a voltage-value between 75% and 85% of the nominal operating voltage of the battery pack, to a higher default voltage limit having a voltage-value between 100% and 105% of the nominal operating voltage of the battery pack. An example of such default predetermined voltage limits is given with reference to FIG. 2. In some examples, the extended predetermined voltage limits extend from a lower extended voltage limit having a voltage-value between 75% and 85% of the nominal operating voltage of the battery pack, to a higher extended voltage limit having a voltage-value between 105% and 115% of the nominal operating voltage of the battery pack. An example of such extended predetermined voltage limits is given with reference to FIG. 2. In some examples, default predetermined voltage limits are stricter than the extended predetermined voltage limits. In some examples, the extended predetermined voltage limits are stricter than predetermined safety critical voltage limits of the battery pack.

In a step S30, e.g. being a third step S30, the determined temperature of the service brakes is compared by the processor device with a predetermined temperature threshold. In some examples, the predetermined temperature threshold is chosen as a value of between 300° C. and 600° C. For example, the predetermined temperature threshold is chosen as a value of between 400° C. and 500° C., e.g. 450° C.

In a step S40, e.g. being a fourth step S40, in response of the determined temperature of the service brakes being above the predetermined temperature threshold, the battery pack of the electric vehicle is operated, by the processor device, within the operating window defined by extended predetermined voltage limits. As previously described, the extended predetermined voltage limits have the upper limit exceeding the corresponding upper limit of the default predetermined voltage limits. Thus, the processor device may set the operating window of the battery pack.

In an optional step S5, e.g. carried out previously to step S10, measurement temperature data from a temperature sensor of the service brakes is received by the processor device, and the received measurement temperature data is used as the determined temperature of the service brakes of step S10.

In an optional step S25, e.g. carried out prior to step S30, a vehicle driving condition is identified, by the processor device, as belonging to a group of predefined vehicle driving conditions defined as regenerative limiting. The step S30 of comparing the determined temperature of the service brakes with the predetermined temperature threshold may advantageously be performed in response to step S25 of identifying such regenerative limiting vehicle condition. As a further alternative, the step S40 of operating the battery pack within the operating window defined by extended predetermined voltage limits is further carried out in response to step S25 of identifying such regenerative limiting vehicle condition. That is, in the latter example, the step S40 of operating the battery pack within the operating window defined by extended predetermined voltage limits is carried out in response to the determined temperature of the service brakes being above the predetermined temperature threshold and the identification of a regenerative limiting vehicle condition. The vehicle driving condition subject to the identification of the regenerative limiting vehicle conditions is typically the present, or current, vehicle driving condition.

In an optional sub-step S25a to step S25, the state-of-charge, SOC, of the battery pack is compared, by the processor device, with a preset SOC threshold, wherein a regenerative limiting vehicle driving condition is defined as a vehicle driving condition in which the SOC of the battery pack is equal to, or above, the preset SOC threshold. In some examples, the preset SOC threshold is the upper limit of a predefined operating window of the battery pack defined by default predetermined SOC limits. In other words, the regenerative limiting vehicle conditions may be defined as vehicle conditions in which charging of the battery pack by the regenerative braking system to its nominally fully charged level occurs. The nominally fully charged level may for example be set by the upper limit of a predefined operating window according to default predetermined SOC limits. The default predetermined SOC limits may e.g. extend from a lower default SOC limit having a SOC-value between 15% and 30%, to an upper default SOC limit having a SOC-value between 65% and 85%.

In an optional step S22, e.g. carried out prior to, simultaneously, or subsequent to step S20, operating windows of the battery pack of the electric vehicle defined by its operating current according to default predetermined current limits, and according to extended predetermined current limits in which at least one of the upper limit and lower limit exceeds the corresponding limit of the default predetermined current limits are determined by the processor device. For example, and with reference to FIG. 1, the processor device may determine the operating windows by receiving instructions, or data 200, of the same from the memory 210.

In an optional step S42, in response of the determined temperature of the service brakes being above the predetermined temperature threshold, the battery pack of the electric vehicle is operated, by the processor device, within the operating window defined by the default predetermined current limits.

In an optional step S44, carried out in parallel to, or instead of, step S42, in response of the determined temperature of the service brakes being above the predetermined temperature threshold, the battery pack of the electric vehicle is operated, by the processor device, within the operating window defined by the extended predetermined current limits. In some examples, the extended predetermined current limits are stricter than predetermined safety critical current limits of the battery pack.

In an optional step S50, in response of the determined temperature of the service brakes being below the predetermined temperature threshold, the battery pack of the electric vehicle is operated, by the processor device, within the operating window defined by default predetermined voltage limits.

In the flow chart of FIG. 3, the step S30 of comparing the determined temperature of the service brakes with a predetermined temperature threshold is shown as a decision making step S30. Thus, depending on the outcome of the decision making step S30, the operation of the battery pack is either in accordance with step S40 or in accordance with step S50. In other words, the decision making step S30 may e.g. comprise comparing, by the processor device, the determined temperature of the service brakes with a predetermined temperature threshold, and depending on the outcome of the comparison, operate, by the processor device, the battery pack in accordance with step S40 in response to that the determined temperature of the service brakes is above the predetermined temperature threshold, and in accordance with step S50 in response to that the determined temperature of the service brakes is below the predetermined temperature threshold.

The controlling apparatus 200 of FIG. 1 may be configured to perform the method as described with reference to FIG. 3. The method as described with reference to FIG. 3 may thus be implemented in a computer program product comprising program code for performing, when executed by the processor device, the method described with reference to FIG. 3. Alternatively the method as described with reference to FIG. 3 may be implemented in a non-transitory computer-readable storage medium comprising instructions, which when executed by the processor device, cause the processor device to perform the method as described with reference to FIG. 3. Thus, the control unit 200 may comprise instructions to cause the powertrain 100 (e.g. the battery pack 114) to be operated according to at least some of the steps described with reference to FIG. 3. The control unit 200 of the truck 1 of FIG. 1 may constitute, or be comprised in, a control system comprising one or more control units configured to perform the method as described with reference to FIG. 3. Such control system 1000 is now described with reference to FIG. 4.

Figure 4:
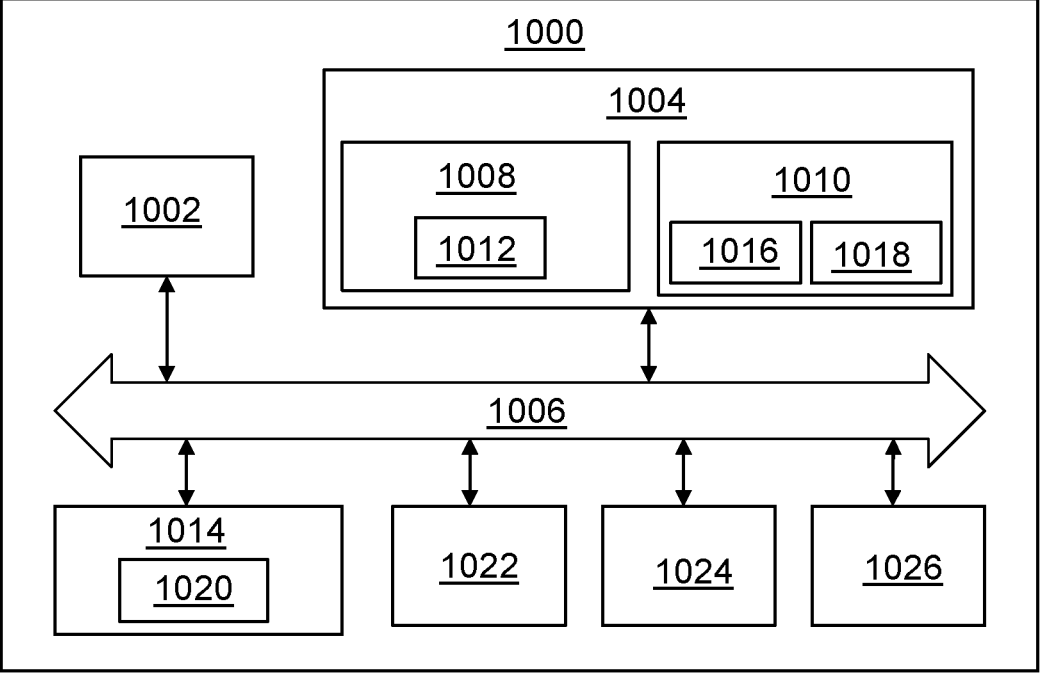
FIG. 4 is a schematic diagram of an exemplary computer system for implementing examples disclosed herein, according to one example.

FIG. 4 is a schematic diagram of a computer system 1000 for implementing examples disclosed herein, e.g. the method as described with reference to FIG. 3. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processor device 1002 (may also be referred to as a control unit), a memory 1004, and a system bus 1006. The computer system 1000 may include at least one computing device having the processor device 1002. The system bus 1006 provides an interface for system components including, but not limited to, the memory 1004 and the processor device 1002. The processor device 1002 may include any number of hardware components for conducting data or signal processing or for executing computer code stored in memory 1004. The processor device 1002 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processor device 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processor device 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program product 1020 stored on a transitory or non-transitory computer-usable or computer-readable storage medium (e.g., single medium or multiple media), such as the storage device 1014, which includes complex programming instructions (e.g., complex computer-readable program code) to cause the processor device 1002 to carry out the steps described herein. Thus, the computer-readable program code can comprise software instructions for implementing the functionality of the examples described herein when executed by the processor device 1002. The processor device 1002 may serve as a controller or control system for the computer system 1000 that is to implement the functionality described herein.

The computer system 1000 also may include an input device interface 1022 (e.g., input device interface and/or output device interface). The input device interface 1022 may be configured to receive input and selections to be communicated to the computer system 1000 when executing instructions, such as from a keyboard, mouse, touch-sensitive surface, etc. Such input devices may be connected to the processor device 1002 through the input device interface 1022 coupled to the system bus 1006 but can be connected through other interfaces such as a parallel port, an Institute of Electrical and Electronic Engineers (IEEE) 1394 serial port, a Universal Serial Bus (USB) port, an IR interface, and the like. The computer system 10100 may include an output device interface 1024 configured to forward output, such as to a display, a video display unit (e.g., a liquid crystal display (LCD) or a cathode ray tube (CRT)). The computer system 1000 may also include a communications interface 1026 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence. Thus, it should be noted that the naming of the steps not necessarily, but might according to at least one example, relate to the order in which the steps are carried out.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:

determine the temperature of service brakes of an electric vehicle, determine an operating window of a battery pack of the electric vehicle defined by its operating voltage according to default predetermined voltage limits, and an operating window of the battery pack of the electric vehicle defined by its operating voltage according to extended predetermined voltage limits in which the upper limit exceeds the corresponding upper limit of the default predetermined voltage limits;

compare the determined temperature of the service brakes with a predetermined temperature threshold, in response of the determined temperature of the service brakes being above the predetermined temperature threshold, operate the battery pack of the electric vehicle within the operating window defined by extended predetermined voltage limits.

2. A computer-implemented method, comprising:

determining, by a processor device of a computer system, the temperature of the service brakes of an electric vehicle, determining, by the processor device, operating windows of a battery pack of the electric vehicle defined by its operating voltage according to default predetermined voltage limits, and according to extended predetermined voltage limits in which the upper limit exceeds the corresponding upper limit of the default predetermined voltage limits;

comparing, by the processor device, the determined temperature of the service brakes with a predetermined temperature threshold, in response of the determined temperature of the service brakes being above the predetermined temperature threshold, operating, by the processor device, the battery pack of the electric vehicle within the operating window defined by extended predetermined voltage limits.

3. The method of claim 2, further comprising:

identifying, by the processor device, a vehicle driving condition as belonging to a group of predefined vehicle driving conditions defined as regenerative limiting, wherein comparing the determined temperature of the service brakes with a predetermined temperature threshold is performed in response to identifying such regenerative limiting vehicle condition.

4. The method of claim 3, further comprising:

comparing, by the processor device, a state-of-charge, SOC, of the battery pack with a preset SOC threshold, wherein a regenerative limiting vehicle driving condition is defined as a vehicle driving condition in which the SOC of the battery pack is equal to, or above, the preset SOC threshold.

5. The method of claim 4, wherein the preset SOC threshold is the upper limit of a predefined operating window of the battery pack defined by default predetermined SOC limits.

6. The method of claim 2, further comprising:

determining, by the processor device, predefined operating windows of the battery pack of the electric vehicle defined by its operating current according to default predetermined current limits, and according to extended predetermined current limits in which at least one of the upper limit and lower limit exceeds the corresponding limit of the default predetermined current limits.

7. The method of claim 6, further comprising:

in response of the determined temperature of the service brakes being above the predetermined temperature threshold, operating, by the processor device, the battery pack of the electric vehicle within the operating window defined by the default predetermined current limits.

8. The method of claim 6, further comprising:

in response of the determined temperature of the service brakes being above the predetermined temperature threshold, operating, by the processor device, the battery pack of the electric vehicle within the operating window defined by the extended predetermined current limits.

9. The method of claim 6, wherein the extended predetermined current limits are stricter than predetermined safety critical current limits of the battery pack.

10. The method of claim 2, further comprising:

receiving, by the processor device, measurement temperature data from a temperature sensor of the service brakes, and using the received measurement temperature data as the determined temperature of the service brakes.

11. The method of claim 2, wherein the default predetermined voltage limits extend up to a higher default voltage limit having a voltage-value between 100% and 105% of the nominal operating voltage of the battery pack.

12. The method of claim 2, wherein the extended predetermined voltage limits extend up to a higher extended voltage limit having a voltage-value between 105% and 115% of the nominal operating voltage of the battery pack.

13. The method of claim 2, wherein the extended predetermined voltage limits are stricter than predetermined safety critical voltage limits of the battery pack.

14. The method of claim 2, wherein the predetermined temperature threshold is chosen as a value of between 300° C. and 600° C.

15. An energy storage system of a vehicle, the energy storage system comprising a battery pack connectable to regenerative braking system configured to charge the battery pack by regenerative braking of the vehicle, and a control unit connectable to service brakes of the vehicle, the control unit being configured to:

determine the temperature of the service brakes of an electric vehicle, determine operating windows of the battery pack defined by its operating voltage according to default predetermined voltage limits, and according to extended predetermined voltage limits in which the upper limit exceeds the corresponding upper limit of the default voltage predetermined limits;

compare the determined temperature of the service brakes with a predetermined temperature threshold, in response of the determined temperature of the service brakes being above the predetermined temperature threshold, operate the battery pack of the electric vehicle within the predefined operating window defined by extended predetermined voltage limits.

16. The energy storage system of claim 15, further comprising:

a temperature sensor configured to provide measurement temperature of the service brakes, wherein the control unit is configured to use the received measurement temperature data as the determined temperature of the service brakes.

17. A vehicle comprising the processor device to perform the method of claim 2.

18. A non-transitory computer program product comprising program code for performing, when executed by the processor device, the method of claim 2.

19. A control system comprising one or more control units configured to perform the method of claim 2.

20. A non-transitory computer-readable storage medium comprising instructions, which when executed by the processor device, cause the processor device to perform the method of claim 2.

* * * * *